(12) United States Patent
Kanto et al.

(10) Patent No.: US 7,848,750 B2
(45) Date of Patent: *Dec. 7, 2010

(54) SYSTEM FOR CHANGING LOCATION REGISTRATION

(75) Inventors: Hiroshi Kanto, Tokyo (JP); Fukiko Maeda, Yokohama (JP); Koji Chiba, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 111 days.

This patent is subject to a terminal disclaimer.

(21) Appl. No.: 12/118,532

(22) Filed: May 9, 2008

(65) Prior Publication Data

US 2008/0280607 A1    Nov. 13, 2008

Related U.S. Application Data

(63) Continuation of application No. 10/828,977, filed on Apr. 21, 2004, now Pat. No. 7,386,312.

(30) Foreign Application Priority Data

Apr. 22, 2003   (JP) .............................. 2003-117107

(51) Int. Cl.
    H04Q 7/20        (2006.01)
(52) U.S. Cl. ............... 455/435.1; 455/456.1; 455/432.1
(58) Field of Classification Search ...... 455/435.1–436, 455/432.1, 456.1, 552.1
    See application file for complete search history.

(56) References Cited

U.S. PATENT DOCUMENTS

| | | | |
|---|---|---|---|
| 5,918,175 A | 6/1999 | Tayloe et al. ................. | 455/427 |
| 6,119,003 A * | 9/2000 | Kukkohovi ............... | 455/435.2 |
| 6,330,446 B1 | 12/2001 | Mori ........................... | 455/435 |
| 6,393,279 B1 * | 5/2002 | Lee ........................... | 455/426.1 |
| 6,493,552 B1 | 12/2002 | Hicks ........................ | 455/435.2 |
| 6,594,242 B1 | 7/2003 | Kransmo ...................... | 370/331 |
| 6,697,620 B1 | 2/2004 | Lamb et al. ............... | 455/432.1 |
| 7,386,312 B2 | 6/2008 | Kanto et al. .............. | 455/435.1 |
| 2001/0012776 A1 | 8/2001 | Chandler et al. ........... | 455/435 |
| 2001/0036827 A1 | 11/2001 | Edlund et al. ............ | 455/432.1 |

(Continued)

FOREIGN PATENT DOCUMENTS

JP      2002-142247      5/2002

(Continued)

OTHER PUBLICATIONS

European Search Report dated May 12, 2009, in European Application No. 08002423.5 (7 pgs.).

(Continued)

*Primary Examiner*—Temica M Beamer
(74) *Attorney, Agent, or Firm*—Brinks Hofer Gilson & Lione

(57)  ABSTRACT

A mobile terminal, which is registered to either a first mobile communication network or a second communication network, determines whether it is possible to register to the first mobile communication network on the basis of control information received from the second mobile communication network. Then, the mobile terminal attempts to register to the first mobile communication network a predetermined number of times in a case that it is determined that it is possible to register to the first mobile communication network.

25 Claims, 6 Drawing Sheets

U.S. PATENT DOCUMENTS

| | | | |
|---|---|---|---|
| 2002/0068564 A1 | 6/2002 | Gustavsson et al. | 455/435 |
| 2002/0105927 A1 | 8/2002 | Holma et al. | 370/331 |
| 2004/0203780 A1 | 10/2004 | Julka et al. | 455/436 |

FOREIGN PATENT DOCUMENTS

| | | |
|---|---|---|
| JP | 2002-159072 | 5/2002 |
| JP | 2003-102059 | 4/2003 |
| WO | WO 0042808 A1 | 7/2000 |
| WO | WO 0201902 A1 | 1/2002 |
| WO | WO 03/017693 A2 | 2/2003 |

OTHER PUBLICATIONS

European Office Action dated Aug. 4, 2006, in European Application No. 04009409.6.

Japanese Office Action dated Feb. 19, 2008, in Japanese Application No. 2003-117107 (3 pgs.), and full translation (3 pgs).

Japanese Office Action dated Sep. 24, 2008, in Japanese Application No. 2003-117107 (3 pgs.), and full translation (3 pgs).

Digital Car Phone System, Standards RCR STD-271, Japan, Digital Association of Radio Industries and Business, Jul. 25, 2000, Second Separate Volume, p. 877 (2 pgs.), and concise explanation of relevance (1 pg).

Digital Car Phone System, Standards RCR-STD-271, Japan, Digital Association of Radio Industries and Business, Jul. 2000, First Separate Volume, p. 299 (2 pgs.), and concise explanation of relevance (1 pg).

Digital Cellular Telecommunications System; UMTS; Service Aspects and Requirements for Network Sharing, Global System for Mobile Communications, Mar. 2003, ETSI TR 122 951 V6.1.0, Release 6.0, France XP-002317360 © European Telecommunication Standards Institute 2003.

* cited by examiner

| REGISTRATION POSSIBILITY INFORMATION |
|---|
| 00 |
| 01 |

| A TERMINAL IDENTIFIER | A REGISTRATION SECTION |
|---|---|
| 090XXXXXXXX | 1 |

SYSTEM FOR CHANGING LOCATION REGISTRATION

This application is a continuation of U.S. patent application Ser. No. 10/828,977, filed Apr. 21, 2004, now U.S. Pat. No. 7,386,312 which claims the benefit of the filing date under 35 U.S.C. §119(a)-(d) to Japanese Application Serial. No. JP 2003-117107, filed Apr. 22, 2003, all of which are incorporated by reference.

BACKGROUND

1. Technical Field

The present invention relates to techniques for carrying out location registration to a plurality of mobile communication networks.

2. Related Art

In recent years, a number of third generation mobile communication network systems, such as W-CDMA (Wideband Code Division Multiple Access) cdma 2000(Code Division Multiple Access 2000) have been provided. Unlike second generation mobile communication network systems, such as GSM(Global System for Mobile Communications), third generation mobile communication network systems can provide such services as high-speed data communication, or international roaming. However, service areas for mobile communications of a third generation system are smaller than those for mobile communications of a second generation system; therefore, it is common for a third generation system user to register his/her own mobile terminal to a mobile communication network of a second generation system in a case that a mobile communication network of a third generation system is not available.

To overcome the above problems, Patent Publication 1(JP2002-535902 corresponding to U.S. Pat. No. 6,594,242) discloses techniques to enable a user of a mobile terminal to switch from a mobile communication network of a third generation system to that of a second generation system. A base station belonging to a mobile communication network of a third generation system transmits to a mobile terminal when the mobile terminal is within range of a base station of a mobile communication network of a second generation system, control information including channel information specifying a base station belonging to the network of the second generation system. Then, the mobile terminal specifies connects to an available base station belonging to a mobile communication network of the second generation system on the basis of the channel information included in the above control information. Accordingly, a mobile communication network to which a mobile terminal is connected is changed from a mobile communication network of a third generation system to a mobile communication network of a second generation system.

Where both second and third generation mobile communication systems are available, it is preferable to use a mobile communication service of a third generation system, since a third generation system has the above-described merits in comparison with a second generation system. In one method for using a third generation system by priority, a mobile terminal executes the following operations: A mobile terminal, standing by for a call in a mobile communication network of a second generation system, cancels its standby status periodically, and detects location information transmitted from a mobile communication network of a third generation system. Then, the mobile terminal is registered to a mobile communication network of a third generation system if such location information is detected.

However, when in the process of detecting location information transmitted from a mobile communication network of a third generation system, a user of a mobile terminal cannot answer an incoming call via the mobile communication network of the second generation system. That is to say, if the mobile terminal is registered to a mobile communication network of a third generation system without any restrictions, it is difficult to call a mobile terminal via a mobile communication network of a second generation system. Further, as compared with standing by for a call, location registration uses more electric power. From this point of view, it is not satisfactory to be registered to a mobile communication network of a third generation system without any restrictions.

DISCLOSURE OF INVENTION

To overcome the above problems, the present invention has an object of providing techniques for registering a mobile terminal to a first mobile communication terminal by priority without disturbing communication performed via a second mobile communication network.

To solve the above problems, the present invention provides a mobile terminal comprising communication means having a communication function for using a first mobile communication network and a second mobile communication network; determination means for determining, when the mobile terminal is registered to the second mobile communication network, whether it is possible to register to the first mobile communication network, on the basis of notification information transmitted from the second mobile communication network; and attempt means for attempting, in a case that it is determined that it is possible to register to the first mobile communication network, to register to the first mobile communication network.

Further, the present invention provides a communication system comprising a first mobile communication network; a second mobile communication network having a base station for transmitting notification information indicating that it is possible to register to the first mobile communication network; and a management device, in accordance with location registration of a mobile terminal to either the first mobile communication network or the second mobile communication network, for storing data in correlation with a identifier of the mobile terminal, the data indicating a mobile communication network to which the mobile terminal is registered.

Further, the present invention provides A location registration changing method comprising a first step of determining in a mobile terminal whether it is possible to register to a first mobile communication network on the basis of notification information received from a second mobile communication network, the mobile terminal having a communication function for using the first mobile communication network and the second mobile communication network; a second step of transmitting from the mobile terminal to the first mobile communication network, a notification including an identifier, in a case that the determination is positive; and a third step of receiving in a management device a notification transmitted by the mobile terminal in the second step through the first mobile communication network, and storing in the management device data indicating that the mobile terminal is registered to the first mobile communication network, the mobile terminal being specified by an identifier included in the notification.

BRIEF DESCRIPTION OF THE DRAWINGS

FIG. 6 is a flowchart indicating a flow of the operation when a control unit 510 of mobile terminal 50 is turned on.

BEST MODE FOR CARRYING OUT THE INVENTION

A. Configuration

<1. Configuration of a Communication System>

Figure 1:
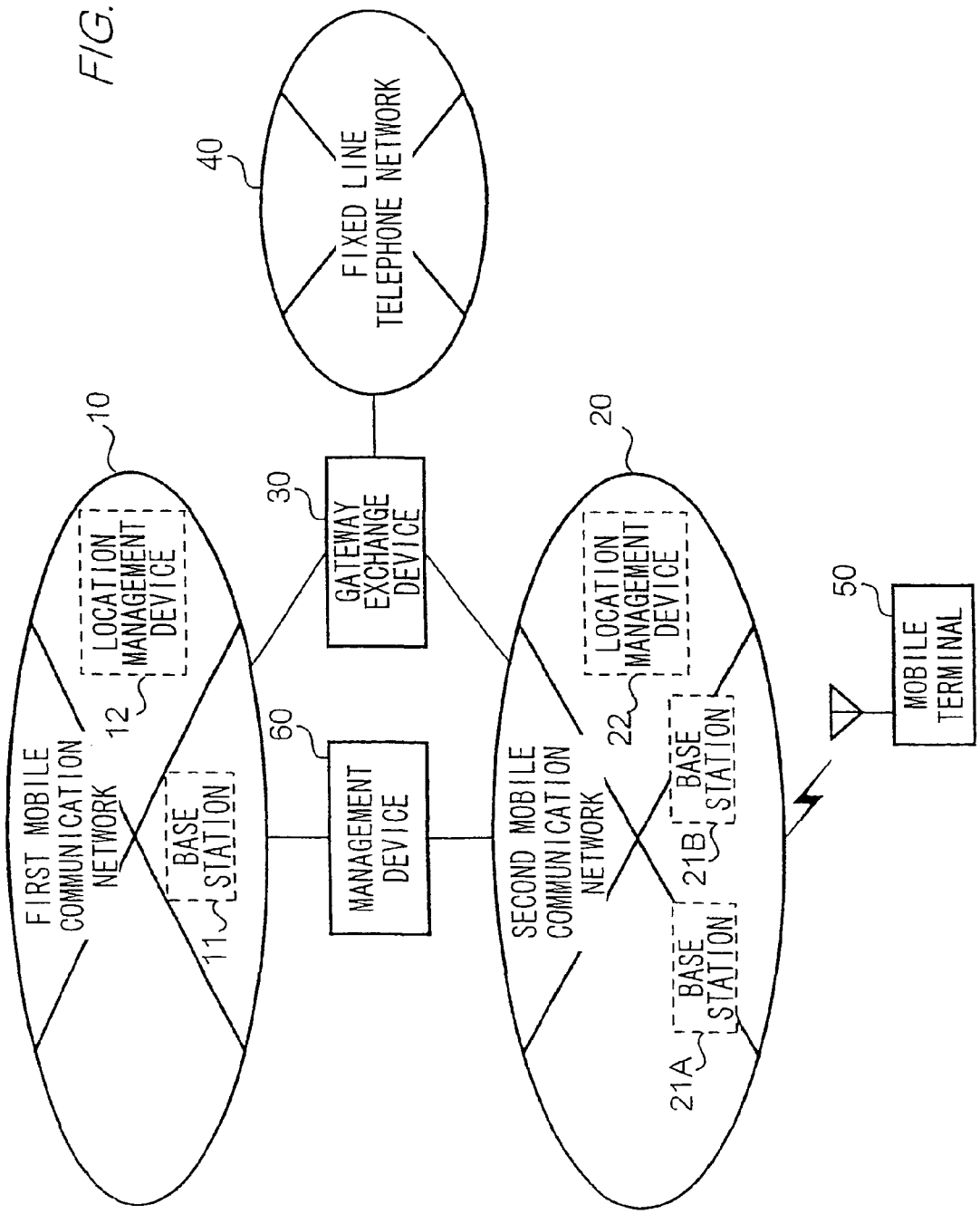
FIG. 1 is a diagram indicating an example of the overall configuration of a communication system according to the present invention.
Figures 2, 3, 4:
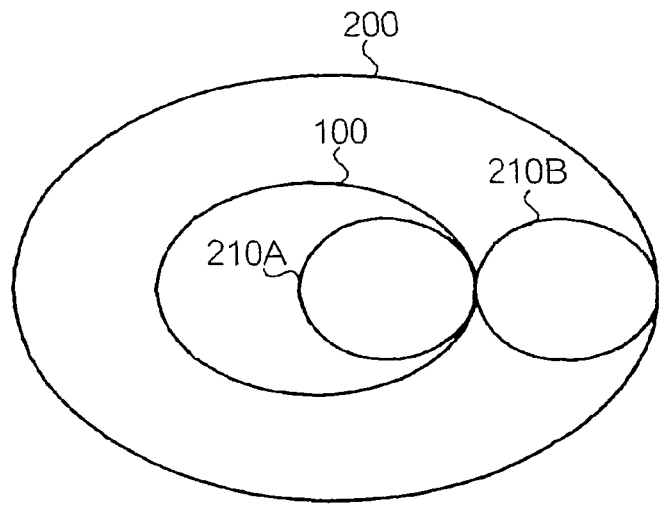
FIG. 2 is a diagram explaining a relationship between a service area 100 of a first mobile communication network 10, a service area 200 of a second mobile communication network 20, a location registration area 210A, and a location registration area 210B.
FIG. 3 is an example of registration possibility information transmitted from a base station 21 A and a base station 21 B.
FIG. 4 is an example of a location registration management table stored in a management device 60.

FIG. 1 is a diagram indicating an example of the overall configuration of a communication system according to the present invention. As shown in FIG. 1, a first mobile communication network 10 and a second mobile communication network 20 are connected to a fixed telephone line 40 through a gateway exchange device 30. In this embodiment, first mobile communication network 10 is a mobile communication network of a W-CDMA system, and second mobile communication network 20 is a mobile communication network of a PDC system. Hereafter, a service area of first mobile communication network 10 is referred to as "service area 100", and a service area of second mobile communication network 20 is referred to as "service area 200". As shown in FIG. 2, service area 200 covers service area 100. In this embodiment, a case will be described where service area 200 covers the whole of service area 100, however, it is also possible that service area 200 covers a part of service area 100. Further, in this embodiment, first mobile communication network 10 is a W-CDMA system, and second mobile communication network 20 is a PDC system; however, first mobile communication network 10 may be a mobile communication network of a cdma 2000 system, and second mobile communication network 20 may be a mobile communication network of a GSM(Global System for Mobile Communication) system. That is to say, any combination of systems is possible, provided that a system of first mobile communication network 10 is different from a system of first mobile communication network 20.

First mobile communication network 10 includes base station 11 and location management device 12. A radio area is formed with base station 11 at its center, and base station 11 executes radio communication with a mobile phone of a W-CDMA system. For the sake of explanation, in FIG. 1, only one base station is indicated, but there are in fact a number of base stations in first mobile communication network 10. Service area 100 of first mobile communication network 10 is divided into a plurality of location registration areas, and there are a number of base stations in one location registration area. By transmitting to a mobile phone notification information including information specifying a location registration area (hereafter, referred to as "location information"), each base station notifies its location information to a mobile phone. A mobile phone can be registered to first mobile communication network 10 by storing, in location management device 12, location information correlating with a terminal identifier (e.g. a telephone number assigned to a mobile phone) specifying a mobile phone. That is to say, location management device 12 manages a location registration area in which a mobile phone, being registered to first mobile communication network 10 and using a mobile telephone service, is located.

As shown in FIG. 1, second mobile communication network 20 includes a base station 21A and a base station 21B, and location management device 22. Hereafter, it is referred to as "base station 21" except where it is necessary to distinguish base station 21A and base station 21B. A radio area is formed with base station 21 at its center, and base station 21 executes radio communication with a PDC mobile phone in radio area. There are two base stations in FIG. 1; however, there are actually a larger number of base stations. A service area 200 of second mobile communication network 20 is divided into a plurality of location registration areas in the same manner as that of first mobile communication network 10, and there are a plurality of base stations in one location registration area. In this embodiment, base station 21A is in location registration area 210A, and base station 21B is in location registration area 210B.

Base station 21 transmits to a mobile phone in radio area formed by base station 21, notification information including location information of a location registration area to which base station 21 belongs. Additionally, base station 21 transmits to a mobile phone, information (hereafter referred to as "registration possibility information") indicating whether it is possible to be registered to first mobile communication network 10, a mobile phone in a location registration area to which base station 21 belongs, along with the above notification information. As shown in FIG. 3, registration possibility information is 2-bit information having a bit pattern of either "00" or "01". A bit pattern "00" indicates that it is impossible for a mobile phone to be registered to first mobile communication network 10, and a bit pattern "01" indicates that it is possible for a mobile phone to be registered to first mobile communication network 10. For example, base station 21A transmits to a mobile phone, notification information including registration possibility information whose bit pattern is "01", and base station 21b transmits to a mobile phone, notification information including registration possibility information whose bit pattern is "00". This is because location registration area 210A to which base station 21A belongs is within service area 100, and location registration area 210B to which base station 21B belongs is outside service area 100.

On the other hand, a mobile phone to which registration information is transmitted from base station 21 can be registered to second mobile communication network 20 in the same manner as that of first mobile communication network 10. That is to say, location management device 22 manages location registration areas in which a mobile phone, being registered to second mobile communication network 20 and using a mobile telephone service, is located.

A mobile terminal 50 is a mobile phone being registered to either first mobile communication network 10 or second mobile communication network 20, and standing by for a call. More specifically, mobile terminal 50 stores a terminal identifier for specifying mobile terminal 50, and is registered to first mobile communication network 10 by storing in location management device 12, a terminal identifier correlated with location information transmitted from base station 11. Further, mobile terminal 50 is registered to second mobile communication network 20 by storing in location management device 22, a terminal identifier con-elated with location information transmitted from base station 21. Additionally, mobile terminal 50 changes location registration area of mobile terminal 50 from first mobile communication network 10 to second mobile communication network 20, or from second mobile communication network 20 to first mobile communication network 10. Then, mobile terminal 50 notifies a management device 60 that mobile terminal 50 is newly registered to first mobile communication network 10 or second mobile communication network 20, or is registered to first mobile communication network 10 from second mobile communication network 20 or the other way around.

Management device 60 is a computer device connected to first mobile communication network 10 and second mobile communication network 20, and stores a location registration management table as shown in FIG. 4. A location registration management table stores a terminal identifier of mobile terminal 50 in correlation with a registration section. A registration section contains the information specifying a mobile communication network to which mobile terminal 50 is registered and stands by for a call. In this embodiment, a registration section has a value of either "1" or "0". "1" indicates that mobile terminal 50 is registered to first mobile communication network 10 and stands by for a call, and "0" indicates that mobile terminal 50 is registered to second mobile communication network 20 and stands by for a call. Also, management device 60 updates the contents of a location registration management table on the basis of notifications transmitted from mobile terminal 50. In this manner, management device 60 ensures that either mobile terminal 50 is registered to first mobile communication network 10 and stands by for a call or, mobile terminal 50 is registered to second mobile communication network 20 and stands by for a call. Hereafter, writing in a location registration management table is referred to as "activating a mobile communication network", a terminal identifier of mobile terminal 50 correlated with a registration section. In this manner, mobile terminal 50 is able to use a voice communication service through a mobile communication network to which mobile terminal 50 is registered by activating a mobile communication network. More specifically, for example, when mobile terminal 50 is called by a telephone connected to fixed telephone line 40, gateway exchange device 30, which has received a call from the above telephone, specifies a mobile communication network to which mobile terminal 50 is registered by referring to a location registration management table. Then, mobile terminal 50 is called in the standard call process manner.

<2. Configuration of Mobile Terminal 50>

Figure 5:
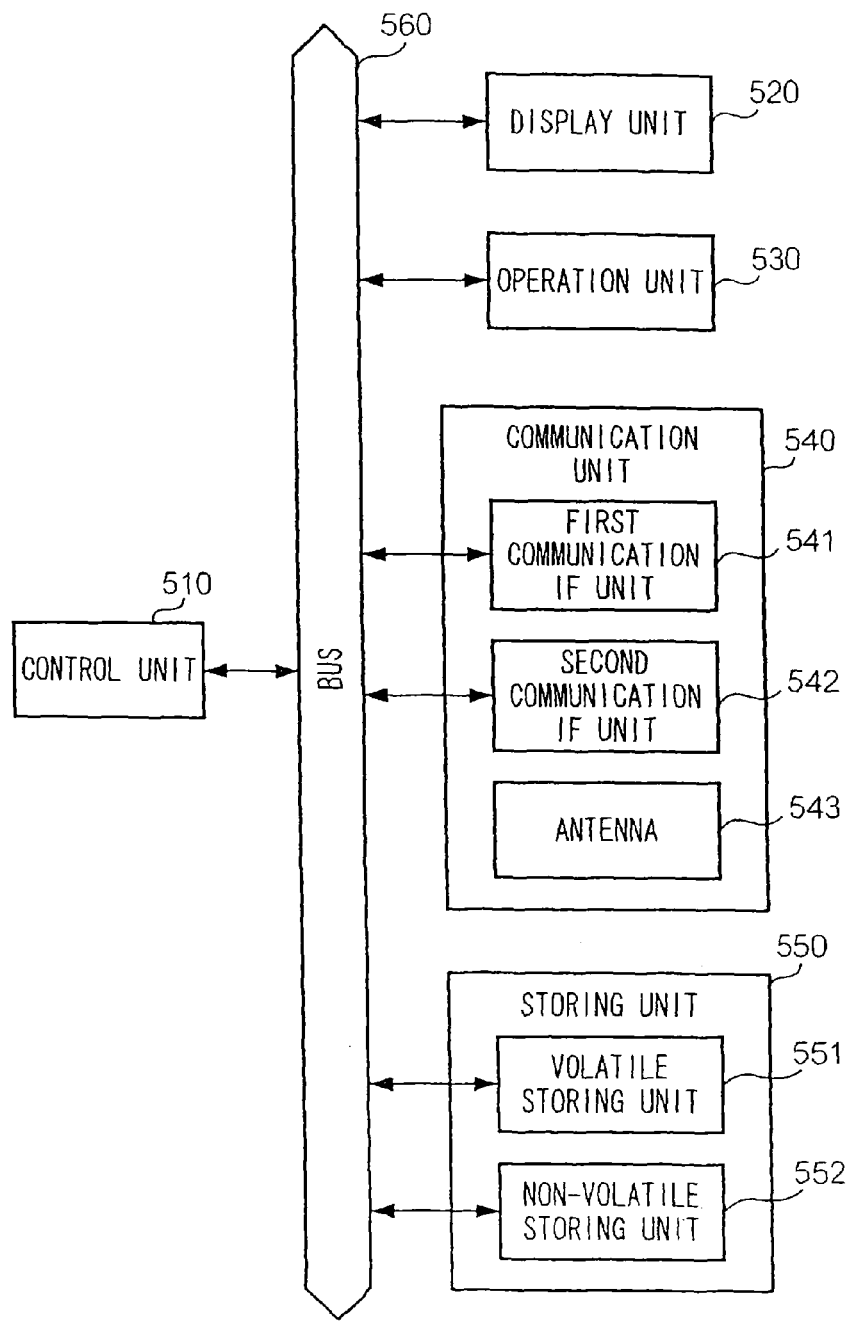
FIG. 5 is a diagram explaining an example of the configuration of a mobile terminal 50.

Next, the configuration example of mobile terminal 50 will be described with reference to FIG. 5. As shown in FIG. 5, mobile terminal 50 is comprised of control unit 510, display unit 520, operation unit 530, communication unit 540, storing unit 550, and bus 560 which connects each unit.

Control unit 510 is, for example, CPU (Central Processing Unit), and to control each unit of mobile terminal 50 by executing software stored in storing unit 550.

Display unit 520 is, for example, a crystal display and a drive circuit, and displays images in compliance with image information transmitted from control unit 510. Operation unit 530 has a plurality of operational identifiers input by users such as numbers, letters, or instructions, and provides to control unit 510, information in compliance with operational identifiers.

Communication unit 540 is comprised of a first communication interface (hereafter, referred to as "IF") unit 541, a second communication IF unit 542, and an antenna 543. First communication IF unit 541 receives information transmitted from base station 11 via antenna 543, and provides the received information to control unit 510. Also, first communication IF unit 541 transmits to base station 11 via antenna 543, information transmitted from control unit 510. Second communication IF unit 542 receives information transmitted from base station 21 via antenna 543, and provides the received information to control unit 510. Also, second communication IF unit 542 transmits to base station 21 via antenna 543, information transmitted from control unit 510.

Storing unit 550 has a volatile storing unit 551 and a nonvolatile storing unit 552. Volatile storing unit 551 is, for example, RAM (Random Access Memory) and is used as a work area by control unit 510 running software. Nonvolatile storing unit 552 is configured by EEPROM (Electrically Erasable Programmable Read Only Memory) and ROM (Read Only Memory). A network flag, specifying a mobile communication network to which mobile terminal 50 is registered, is written in EEPROM. A network flag has a value of "1" and "0", and "1" indicates that mobile terminal 50 is registered to first mobile communication network 10, and "0" indicates that mobile terminal 50 is registered to second mobile communication network 20. The above-described location information is written in EEPROM. On the other hand, the above terminal identifiers, OS (Operating System) software, and communication control software are written in ROM. The functions provided to control unit 510 by executing software will be described.

For example, when a user pushes a power button (not shown in FIG. 5) of operation unit 530 to turn on mobile terminal 50, control unit 510 reads out and executes OS software from ROM. The functions for controlling each unit of mobile terminal 50, or for executing other software are provided to control unit 510 running OS software. Then, control unit 510, operating OS after loading OS software, reads out and executes communication control software from ROM. The two functions, unique to a mobile terminal according to the present invention, are provided to control unit 510 being operated in compliance with communication control software.

A first function is to register mobile terminal 50 to either first mobile communication network 10 or second mobile communication network 20, and activate a mobile communication network to which mobile terminal 50 is registered. A second function is to change a mobile communication network in which mobile terminal 50 is registered, and notify management device 60 that a mobile communication network in which mobile terminal 50 is registered is changed. Specifically, when control unit 510 detects that mobile terminal 50 being registered in first mobile communication network 10 and standing by for a call, moves outside service area 100, control unit 510 changes location registration of mobile terminal 50 to second mobile communication network 20 in compliance with a flowchart in FIG. 7, and activates second mobile communication network 20. Also, control unit 510, being registered in second mobile communication network 20 and standing by for a call, determines whether mobile terminal 50 can be registered to first mobile communication network 10 in compliance with a flowchart in FIG. 8. Then, it is determined that registration is possible, control unit 510 attempts to change location registration of mobile terminal 50 to first mobile communication network 10, and activates first mobile communication network 10 in a case that mobile terminal 50 is registered to first mobile communication network 10 successfully.

As described above, in a case that mobile terminal 50 can be registered to either first mobile communication network 10 or second mobile communication network 20, a function for registering mobile terminal 50 to first mobile communication network 10 by priority is provided to control unit 510 operated in accordance with communication control software.

B. Operation

Here, the operation example of a communication system will be described according to the present invention. It is assumed that a user of mobile terminal 50 moves to a location registration area 210B after mobile terminal 50 is turned on in location registration area 210A. Then, a user of mobile terminal 50 moves from location registration area 210B to location registration area 210A.

<1. Operation at the Time when Mobile Terminal 50 is Turned On>

Figure 6:
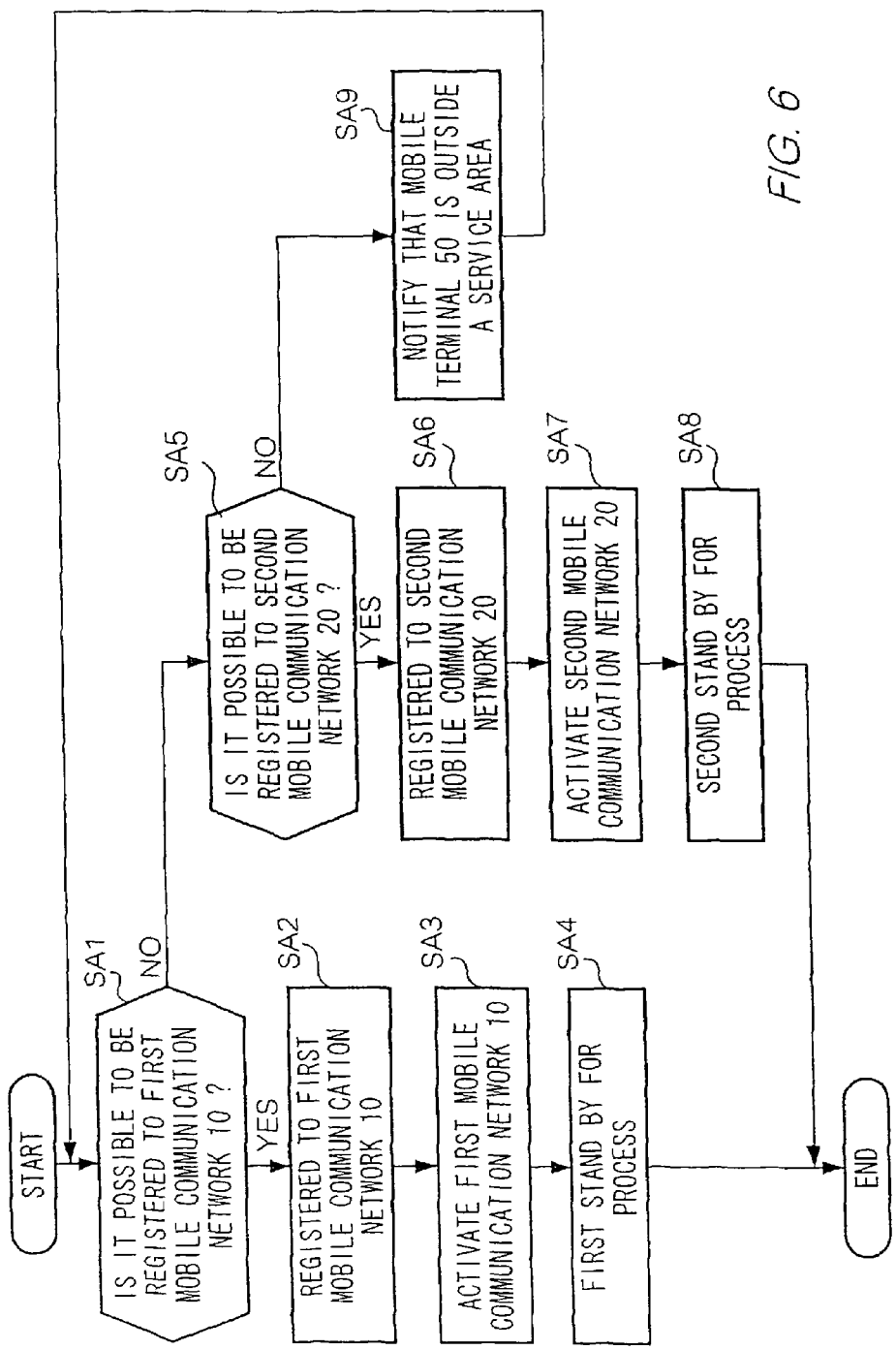

Firstly, the operation of mobile terminal 50 will be described with reference to FIG. 6 at the time of when mobile terminal 50 is turned on in location registration area 210A. FIG. 6 is a flowchart indicating an operational flow performed by control unit 510. As shown in FIG. 6, control unit 510 determines whether mobile terminal 50 can be registered to first mobile communication network 10(Step SA1). Specifically, control unit 510 determines that mobile terminal 50 can be registered to first mobile communication network 10 in a case that control unit 510 receives notification information, transmitted from base station 11, through first communication IF unit 541.

In a case that the determination result in Step SA1 is "Yes", control unit 510 registers mobile terminal 50 to first mobile communication network 10 (Step SA2). Specifically, control unit 510 writes in storing unit 550, location information included in notification information received in step SA1. Then, control unit 510 generates a communication message (hereafter, referred to as "location registration message") requesting to store in location management device 12, location information and a terminal identifier stored in storing unit 550, and transmits a location registration message to location management device 12.

Then, control unit 510 activates first mobile communication network 10 (Step SA3). Specifically, control unit 510 sets a network flag stored in storing Unit 550 to "1", and transmits to management device 60 through first communication IF unit 541, a communication message(hereafter, referred to as "activation message") including a terminal identifier and a control code for activating first mobile communication network 10. Hereafter, control unit 510 operates the process (a first stand by for process) shown in a flowchart of FIG. 7.(Step SA4).

In a case that the determination result in Step SA1 is "No", control unit 510 determines that mobile terminal 50 can be registered to second mobile communication network 20 (Step SA5). Specifically, control unit 510 determines that mobile terminal 50 can be registered to second mobile communication network 20 in a case that control unit 510 receives notification information, transmitted from base station 21, through second communication IF unit 542. In this manner, it is firstly determined whether mobile terminal 50 can be registered to first mobile communication network 10, and then it is determined whether mobile terminal 50 can be registered to second mobile communication network 20 only after it is not possible to be registered to first mobile communication network 10; this is because mobile terminal 50 is to be registered to first mobile communication network 10 by priority.

In a case that the determination result in Step SA5 is "Yes", control unit 510 registers mobile terminal 50 to second mobile communication network 20 (Step SA6). Specifically, control unit 510 writes in storing unit 550, location information included in notification information received in step SA5. Then, control unit 510 generates a location registration message including location information and a terminal identifier stored in storing unit 550, and transmits it to location management device 22 through second communication IF unit 542.

Then, control unit 510 activates second mobile communication network 20 (Step SA7). Specifically, control unit 510 sets a network flag stored in storing unit 550 to "0", and transmits to management device 60 through second communication IF unit 542, an activation message including a terminal identifier and a control code for activating second mobile communication network 20. Hereafter, control unit 510 operates the process (a second stand by for process) shown in a flowchart of FIG. 8 (Step SA8). On the contrary, in a case that the determination result in Step SA5 is "No", control unit 510 displays on display unit 520 that mobile terminal 50 is outside a service area (Step SA9), and repeats the process after Step SA1.

In this embodiment, when mobile terminal 50 is turned on, mobile terminal 50 receives notification information, transmitted from base station 21, by sufficiently electronic field intensity since mobile terminal 50 is in service area 210A (that is to say, around the center of service area 100). Therefore, when the determination result in Step SA1 is "Yes", control unit 510 executes the process from Step SA2 to Step SA4. A location registration message transmitted from mobile terminal 50 in Step SA2 is transmitted to location management device 12 from base station 11, and location management device 12 that has received a location registration message stores a terminal identifier in correlation with location information, both of which are included in a location registration message. On the other hand, an activation message, transmitted from mobile terminal 50 in Step SA3, is transmitted to management device 60 from base station 11. Management device 60 that has received an activation message activates first mobile communication network 10 on the basis of a control code included in the activation message. Specifically, management device 60 writes in registration section of a location registration management table (FIG. 4), "1" in correlation with a terminal identifier included in an activation message.

In this embodiment, a location registration message and an activation message are transmitted to mobile terminal 50 separately; however, a location registration message including a control code may be transmitted to mobile terminal 50. Specifically, when location management device 12 or 22, which has received a location registration message including a control code, transmits an activation message to management device 60, management device 60 activates a mobile communication network to which mobile terminal 50 is registered. As described above, mobile terminal 50 is able to use a mobile communication service through first mobile communication network 10 since mobile terminal 50 is registered to first mobile communication network 10, and first mobile communication network 10 is activated.

<2. Operation at the Time When Mobile Terminal 50 Moves Outside Service Area 100>

Next, the operation of mobile terminal 50 will be described with reference to FIG. 7 when a user of mobile terminal 50 operating a first stand by for process in compliance with a flowchart in FIG. 7, moves from location registration area 210A to location registration area 210B (that is to say, moves outside service area 100).

Figure 7:
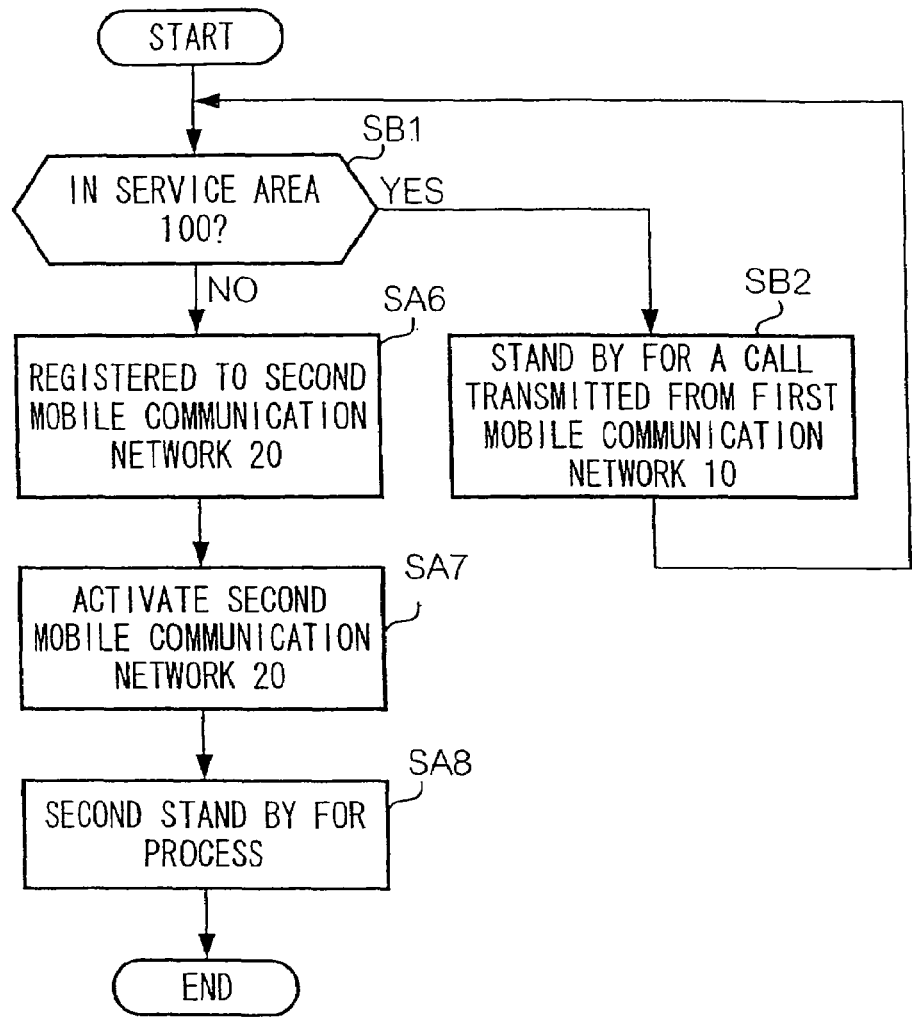
FIG. 7 is a flowchart indicating a flow of an operation when control unit 510 of mobile terminal 50 stands by for a call in a first mobile communication network.

Firstly, control unit 510 operated as shown in a flowchart in FIG. 7 determines whether mobile terminal 50 is in service area 100 (Step SB1). In a case that the determination result in SB1 is "Yes", control unit 510 stands by for a call transmitted from first mobile communication network 10 (Step SB2), and repeats the process after Step SB1. On the other hand, in a case that the determination result in Step SB1 is "No", control unit 510 executes the process from Step SA6 to SA8, registers mobile terminal 50 to second mobile communication network 20, and executes a second stand by for process.

In this embodiment, control unit 510 of mobile terminal 50 cannot receive notification information transmitted from base station 21 since location registration area 210B to which mobile terminal 50 moves is located outside service area 100 as shown in FIG. 2. Therefore, control unit 510 determines that mobile terminal 50 is outside service area 100, and the determination result in SB1 is "No". Hereafter, control unit 510 executes the process from Step SA6 to Step SA8. As described above, mobile terminal 50 is able to use a mobile communication service through second mobile communication network 20 since registration area of mobile terminal 50 is changed to second mobile communication network 20, and second mobile communication network 20 is activated.

<3. Operation at the Time When Mobile Terminal 50 Moves From Location Registration Area 210B to 210A>

Next, the operation of mobile terminal 50 will be described with reference to FIG. 8 when a user of mobile terminal 50 operated as shown in a flowchart in FIG. 8, moves from location registration area 210B to location registration area 210A.

Figure 8:
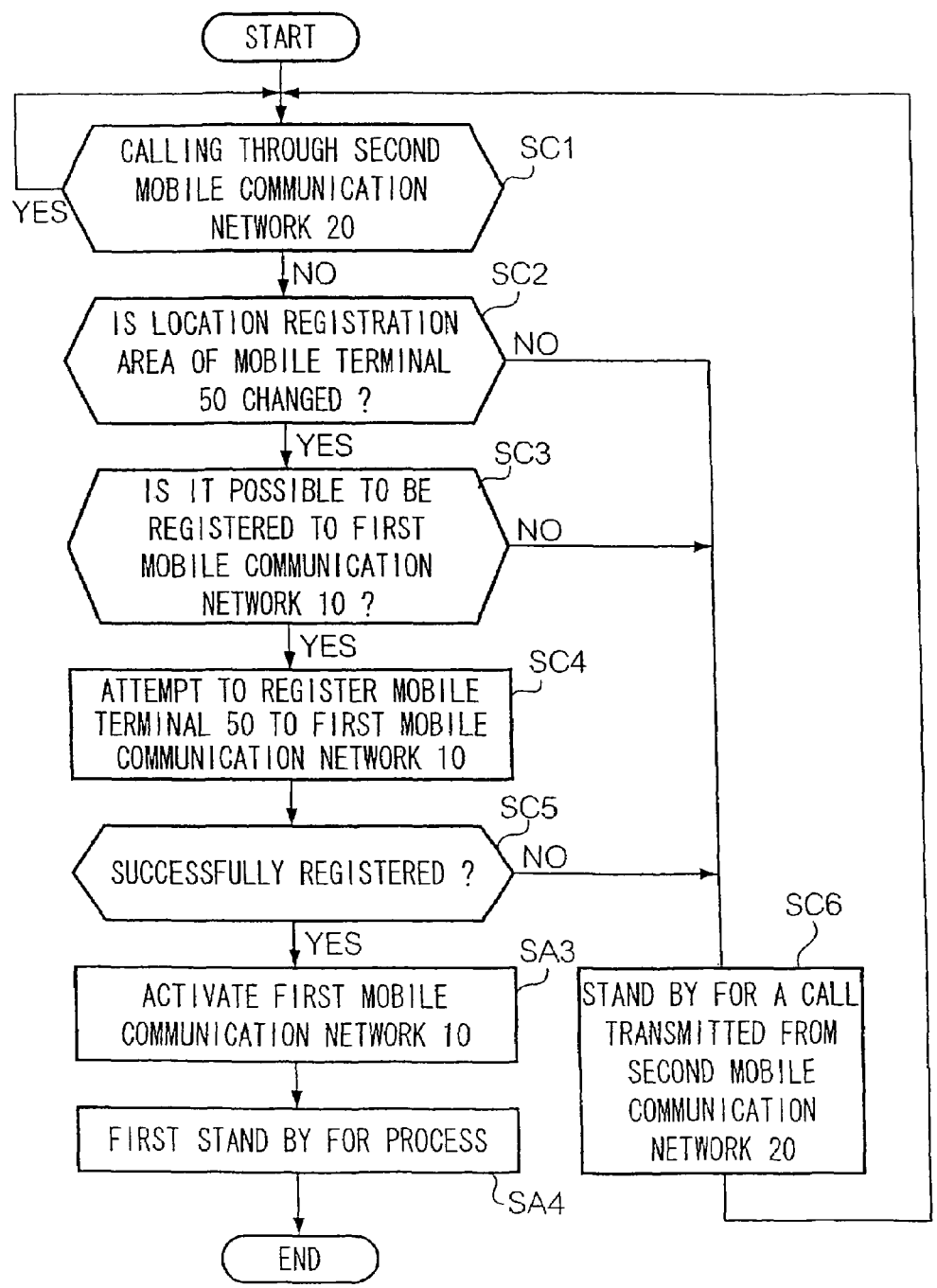
FIG. 8 is a flowchart indicating a flow of an operation when a control unit 510 of mobile terminal 50 stands by for a call in a second mobile communication network.

As shown in FIG. 8, control unit 510 determines whether a mobile terminal 50 user is calling through second mobile communication network 20 (Step SC1), and repeats the Step SC1 process while the determination result in Step SC1 is "Yes". This is because a call is disconnected if the location registration area of mobile terminal 50 is changed from first mobile communication network 10 to second mobile communication network 20 while mobile terminal 50 is in use.

Then, control unit 510 determines whether the location registration area of mobile terminal 50 is changed (Step SC2) in a case that the determination result in Step SCI is "No". Specifically, control unit 510 compares location information included in notification information received through a second communication IF unit 542 with location information stored in storing unit 550. Then, if location information included in notification information is different from location information stored in storing unit 550, control unit 510 determines that the location registration area of mobile terminal 50 is changed.

In a case that the determination result in Step SC2 is "No", control unit 510 executes the process of Step SC6. On the other hand, in a case that the determination result in Step SC2 is "Yes", control unit 510 determines whether mobile terminal 50 can be registered to first mobile communication network 10 from the location registration area where mobile terminal 50 is currently located, on the basis of registration possibility information included in notification information received through second communication IF unit 542 (Step SC3). Specifically, control unit 510 determines that mobile terminal 50 can be registered to first mobile communication network 10 in a case that registration possibility information is "01", and mobile terminal 50 cannot be registered to first mobile communication network 10 in a case that registration possibility information is In this embodiment, location information stored in storing unit 550 of mobile terminal 50 indicates location registration area 210B, and location information received through second communication IF unit 542 indicates location registration area 210A; therefore, the determination result in Step SC2 is "Yes". As a result, control unit 510 executes the process of Step SC3. And, since in this case registration possibility information, included in notification information received through second communication IF unit 542, is "01", the determination result in Step SC3 is "Yes".

In a case that the determination result in Step SC3 is "No", control unit 510 executes the process of Step SC6, and in a case that the determination result in Step SC3 is "Yes", control unit 510 attempts to register mobile terminal 50 to first mobile communication network 10 (Step SC4). Specifically, control unit 510 receives notification information, transmitted from base station 11, through first communication IF unit 541, and attempts to register mobile terminal 50 to first mobile communication network 10 by using location information included in the received notification information. As described above, the process of Step SC4 is executed since the determination result in Step SC3 is "Yes".

Next, control unit 510 determines whether mobile terminal 50 is successfully registered to first mobile communication network 10 (Step SC5), and executes the processes of Steps SA3 to SA4 in a case that the determination result in Step SC5 is "Yes". On the other hand, in a case that the determination result in Step SC5 is "No", control unit 510 stands by for a call from second mobile communication network 20 (Step SC6), and repeats the process after Step SC1. In this embodiment, since mobile terminal 50 is successfully registered to first mobile communication network 10, mobile terminal 50 executes the process of Step SA3 and SA4. Then, the location registration of mobile terminal 50 is changed to first mobile communication network 10, and first mobile communication network 10 is activated. Consequently, mobile terminal 50 is able to use a mobile communication service through first mobile communication network 10.

In this embodiment, it is described that control unit 510 attempts to register mobile terminal 50 to first mobile communication network 10 one time in a case that mobile terminal 50 can be registered to first mobile communication network 10 from a location registration area where mobile terminal 50 is currently located. However, a number of attempts to register mobile terminal 50 to first mobile communication network 10 by control unit 510 is not limited to one time, it is also possible that control unit 510 attempts location registration to first mobile communication network 10 a plurality of times (e.g. three times) at predetermined intervals (e.g. five-minute intervals). That is to say, in the present invention, the number of attempts to register mobile terminal 50 is not limited to one if a maximum number of attempts for location registration to first mobile communication network 10 is set. The reason for setting a maximum number of attempts is to avoid interrupting communication through second mobile communication network 20, and wasting power supply of mobile terminal 50.

<C. Modification>

The present invention is not limited to the embodiments described above, and may be modified within the scope of the invention. For example, the following modifications are possible.

<Modification 1>

In the above embodiment, it is described that mobile terminal 50 is always registered to first mobile communication network 10 by priority. However, mobile terminal 50 may be operated on the basis of one of the following three operation modes selected by a user. The first operation mode is to register to first mobile communication network 10 by priority. The second operation mode is to register only to first mobile communication network 10. The third mode is to register only to second mobile communication network 20. For example, if the second operation mode is selected by a user, as shown in a flowchart of FIG. 6, control unit 510 performs the process of only Step SA9 in a case that the determination result in Step SA1 is "No". Then, in a flowchart of FIG. 7, control unit 510 performs the process of only Step SA9 in place of Steps SA 7 and 8 in a case that the determination result in Step SB1 is "No".

<Modification 2>

In the above embodiment, it is described that a terminal identifier for specifying mobile terminal 50 is pre-stored in storing unit 550. However, mobile terminal 50 can be provided with and use a removable UIM (User Identity Module) having a pre-stored terminal identifier.

<Modification 3>

In the above-described embodiment, it is described that each of base station 21A and 21B transmits registration possibility information, which is 2-bit information having a bit pattern of either "00" or "01". However, registration possibility information transmitted by base station 21 belonging to second mobile communication network 20 is not limited to the above 2-bit information having a bit pattern of either "00" or "01". For example, base station 21 may transmit to mobile terminal 50, registration possibility information for registering mobile terminal 50 to first mobile communication network 10 after a long time period, when base station 21 is located farther from the center of service area 100. Generally, the farther mobile terminal 50 is located from the center of service area 100, the more likely it is that registration to first mobile communication network 10 will fail. Accordingly, when mobile terminal 50 is located in second mobile communication network 20, it is preferable that the farther mobile terminal 50 is located from the center of service area 100, the longer time mobile terminal 50 should be in second mobile communication network 20. Also, base station 21 belonging to a location registration area of service area 100 may transmit to mobile terminal 50, registration possibility information for limiting location registration to first mobile communication network 10. The above examples are to limit location registration to first mobile communication network 10 for using a voice communication service, or for using a packet communication service.

<Modification 4>

Figure 9:
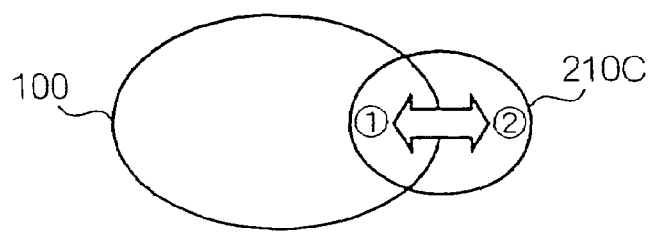
FIG. 9 is a diagram explaining a relationship between service area 100 and a location registration area 210C.

In the above-described embodiment, it is described that when mobile terminal 50 is registered to second mobile communication network 20, mobile terminal 50 attempts to register to first mobile communication network 10 whenever mobile terminal 50 moves from current location registration area to another location registration area. However, mobile terminal 50 attempts to register to first mobile communication network 10 whenever mobile terminal 50 moves from current radio area to another radio area, or from a current sector to another sector within a current radio area even when mobile terminal 50 is in the same radio area. Further, with regard to the case that mobile terminal 50 moves from first mobile communication network 10 to second mobile communication network 20 after moving from second mobile communication network 20 to first mobile communication network 10, when mobile terminal 50 is still in the same location registration area, mobile terminal 50 may not attempt to register to first mobile communication network 10 after attempting more than a predetermined number of times. For example, in location registration area 210C of FIG. 9, when a user of a mobile terminal 50 moves back and forth between "point 1"(within service area 100) and "point 2" (outside service area 100) several times, mobile terminal 50 is registered to first mobile communication network 10 whenever the user moves to "point 1". But, according to the modification, mobile terminal 50 is not registered to first mobile communication network 10 since mobile terminal 50 does not attempt to be registered to first mobile communication network 10 after attempting more than a predetermined number of times, therefore, the inconvenience is solved.

<Modification 5>

In the above embodiment, it is described that when mobile terminal 50 is registered to first mobile communication network 10, first mobile communication network 10 is activated unconditionally. However, it is possible that first mobile communication network 10 may only be registered if a user of mobile terminal 50 is an authorized user.

<Modification 6>

In the above embodiment, it is described that mobile terminal 50 is registered to either first mobile communication network 10 or second mobile communication network 20, and stands by for a call. However, a mobile communication service used by mobile terminal 50 is not limited to voice communication, but may also be packet communication. Further, mobile terminal 50 may use both communication services at the same time. Then, in a case that mobile terminal 50 uses both communication services, mobile terminal 50 may be registered to first mobile communication network 10 from second mobile communication network 20 only if location registration using voice communication and packet communication is performed successfully, or only if location registration using either voice communication or packet communication is successful. Further, when mobile terminal 50 belonging to second mobile communication network 20 performs packet communication, mobile terminal 50 may be registered to first mobile communication network 10 from second mobile communication network 20. This is because although a mobile terminal 50 is moved to another mobile communication network while performing packet communication, packet communication is not susceptible to changing a location registration area of mobile terminal 50 to another mobile communication network, as compared with a voice communication.

The invention claimed is:

1. A mobile terminal comprising:
   a communication unit configured to communicate over a first mobile communication network and a second mobile communication network;
   a control unit coupled with said communication unit, said control unit operable to register said mobile terminal with said second mobile communication network only when registration with said first mobile communication network is unavailable;
   a memory coupled with said control unit, wherein said control unit is further operable to store location information in said memory, said location information comprising first location information indicative of said first mobile communication network or second location information indicative of said second mobile communication network;
   said communication unit further operable to receive from said second mobile communication network notification information comprising said first location information and a registration possibility indication indicative that registration to said first mobile communication network is possible; and said control unit further operable to compare said first location information received in said notification information to location information stored in said memory and always register said mobile terminal with said first communication network in response to said second location information being stored in said memory, and said possibility information being indicative that registration to said first mobile communication network is possible.

2. The mobile terminal of claim 1, wherein said control unit is further operable to register said mobile terminal with said first mobile communication network only after confirmation that said mobile terminal is not calling through said second mobile communication network.

3. The mobile terminal of claim 1, wherein said control unit is further operable to store said first location information in said memory in place of said second location information upon registration with said first mobile communication network.

4. The mobile terminal of claim 1, wherein said control unit is further operable to generate and transmit a first activation message over said first mobile communication network for receipt by a management device, and generate and transmit a second activation message over said second mobile communication network for receipt by said management device, wherein said management device is configured to store and update information specifying a mobile communication network with which said mobile terminal is currently activated to receive a call, based on said first activation message and said second activation message.

5. The mobile terminal of claim 4, wherein said control unit is further operable to generate said first activation message after storage of said second location in said memory, and generate said second activation message after storage of said first location information in said memory.

6. The mobile terminal of claim 4, wherein said first activation message comprises an identifier of said mobile terminal and a first control code to activate said first mobile communication network, and said second activation message comprises said identifier of said mobile terminal and a second control code to activate said second mobile communication network.

7. The mobile terminal of claim 1, wherein said notification information further comprises timing information indicative of a maximum number of attempts to register to said first mobile communication network, and said control unit is further operable to attempt to register to said first mobile communication network a number of times indicated with said timing information before registration with said second mobile communication network.

8. The mobile terminal of claim 7, wherein said notification information further comprises specification of a predetermined interval of time between attempts to register to said first mobile communication network, and said control unit is further operable to attempt to register to said first mobile communication network at said predetermined interval of time.

9. The mobile terminal of claim 1, wherein said communication unit is operable to communicate voice communication and data communication, and said control unit is operable to register with said first mobile communication network for voice communication when said communication unit is currently engaged in a data communication over said second mobile communication network.

10. The mobile terminal of claim 1, wherein said mobile terminal is only registerable with said first mobile communication network when a user of said mobile terminal is an authorized user of said first mobile communication network.

11. The mobile terminal of claim 1, wherein said registration possibility information comprises a limitation of registration with said first mobile communication network to only one of voice communication or data communication.

12. The mobile terminal of claim 1, wherein said first mobile communication network and said second mobile communication network are divided into a plurality of registration areas, and receipt from said second mobile communication network of notification information comprising said first location information and said registration possibility indication indicative that registration to said first mobile communication network is possible is a result of a change of location of said mobile terminal from one registration area to another registration area.

13. The mobile terminal of claim 1, wherein said first mobile communication network and said second mobile communication network are divided into a plurality of radio areas, and receipt from said second mobile communication network of notification information comprising said first location information and said registration possibility indication indicative that registration to said first mobile communication network is possible is a result of a change from a current radio area to another radio area.

14. The mobile terminal of claim 1, wherein said first mobile communication network and said second mobile communication network are divided into a plurality of radio areas each comprising a plurality of sectors, and receipt from said second mobile communication network of notification information comprising said first location information and said registration possibility indication indicative that registration to said first mobile communication network is possible is a result of a change from a current sector to a new sector within a radio area.

15. A location registration changing method comprising:
registering a mobile terminal with a second mobile communication network in response to registration with a first mobile communication network being unavailable;

storing second location information of said second mobile communication network in a memory of said mobile terminal when said mobile terminal is registered to said second mobile communication network;

receiving, with said mobile terminal over said second mobile communication network, notification information that includes first location information of said first mobile communication network and registration possibility information that includes an indication of whether registration to said first mobile communication network is available;

said mobile terminal sensing a change in location of said mobile terminal;

said mobile terminal comparing said second location information stored in said memory with said first location information received in said notification information;

said mobile terminal, responsive to said first location information and said second location information being different, checking said registration possibility information to confirm registration to said first mobile communication network is available; and said mobile terminal attempting to register said mobile terminal to said first mobile communication network in response to confirmation by said mobile terminal that said registration possibility information indicates registration to said first mobile communication network is available.

16. The method of claim 15, wherein said mobile terminal sensing a change in location of said mobile terminal comprises confirming that said mobile terminal is not calling through said second mobile communication network, and delaying sensing a change in location of said mobile terminal when said mobile terminal is currently calling through said second mobile communication network.

17. The method of claim 15, wherein said mobile terminal attempting to register said mobile terminal to said first mobile communication network comprises said mobile terminal transmitting a location registration message over said first mobile communication network to a location management device in said first mobile communication network to register in said first mobile communication network, and said mobile terminal transmitting a notification message over said first mobile communication network to a management device in communication with both said first mobile communication network and said second mobile communication network, said notification message indicative that registration has been successfully changed to said first mobile communication network.

18. The method of claim 17, wherein said mobile terminal transmitting a location registration message comprises transmitting a mobile terminal identifier and location information of said mobile terminal to said location management device, and transmitting a notification message comprises transmitting a terminal identifier of said mobile terminal and a control code to activate said first mobile communication network to said management device.

19. The method of claim 15, wherein receiving, with said mobile terminal over said second mobile communication network, registration possibility information comprises storing said registration possibility information in a memory included in said mobile terminal, and checking said registration possibility information comprises accessing said registration possibility information stored in said memory.

20. The method of claim 15, wherein registering a mobile terminal with a second mobile communication network in response to registration with a first mobile communication network being unavailable comprises first attempting to register with said first mobile communication network and then registering with said second mobile communication network.

21. A communication system comprising:
a first mobile communication network that includes a first location management device, wherein said first location management device is operable to manage location information received from any of a plurality of mobile terminals that choose to register to said first mobile communication network;
a second mobile communication network that includes a second location management device and a base station, said second location management device operable to manage location information received from any of said mobile terminals that choose to register to said second mobile communication network, and said base station positioned within said first mobile communication network,
wherein said base station is operable to transmit, for receipt by any of said mobile terminals that are registered to said second mobile communication network, registration possibility information indicative that registration to said first mobile communication network is possible; and
a management device coupled with said first mobile communication network and said second mobile communication network, said management device operable to store location registration data correlated with a respective mobile terminal identifier for each of said mobile terminals,
said management device further operable to update said location registration data in response to receipt from any one of said mobile terminals of a notification message generated and transmitted with said respective any one of said mobile terminals, wherein said notification message is indicative that said respective any one of said mobile terminals completed registration to one of said first mobile communication network or said second mobile communication network and stands by for a call.

22. The communication system of claim 21, wherein said management device is operable to store said location registration data correlated with a mobile terminal identifier in a management table.

23. The communication system of claim 21, wherein said management device is operable, in response to a request related to a specified mobile terminal, to specify a mobile communication network to which said specified mobile terminal is registered based on said stored location registration data correlated with a mobile terminal identifier.

24. The communication system of claim 21, wherein said management device is operable to receive data from said first mobile communication network when said notification is from a first mobile terminal registered with said first mobile communication network, and said management device is operable to receive data from said second mobile communication network when said notification is from a second mobile terminal registered with said second mobile communication network.

25. The communication system of claim 21, wherein said notification message and said location information are different transmissions from said mobile terminal.

* * * * *